(12) United States Patent
Köhler et al.

(10) Patent No.: US 12,136,241 B2
(45) Date of Patent: Nov. 5, 2024

(54) METHOD FOR DETECTING AN OPTICAL BLOCKAGE OF A CAMERA OF A VEHICLE AND METHOD FOR OPERATING A VEHICLE

(71) Applicant: MERCEDES-BENZ GROUP AG, Stuttgart (DE)

(72) Inventors: Malte Jonas Köhler, Gärtringen (DE); Martin Hümmer, Sindelfingen (DE); Stephan Zinkler, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/687,530

(22) PCT Filed: Jul. 21, 2022

(86) PCT No.: PCT/EP2022/070558
§ 371 (c)(1),
(2) Date: Feb. 28, 2024

(87) PCT Pub. No.: WO2023/030752
PCT Pub. Date: Mar. 9, 2023

(65) Prior Publication Data
US 2024/0273763 A1 Aug. 15, 2024

(30) Foreign Application Priority Data

Aug. 31, 2021 (DE) .................... 10 2021 004 414.2

(51) Int. Cl.
*G06K 9/00* (2022.01)
*G06T 7/73* (2017.01)
*G06T 7/90* (2017.01)

(52) U.S. Cl.
CPC ............... *G06T 7/90* (2017.01); *G06T 7/73* (2017.01); *G06T 2207/30244* (2013.01); *G06T 2207/30248* (2013.01)

(58) Field of Classification Search
CPC ... G06T 7/90; G06T 7/73; G06T 2207/30244; G06T 2207/30248; G06T 2207/30252;
(Continued)

(56) References Cited

U.S. PATENT DOCUMENTS

2019/0084526 A1* 3/2019 Seubert ..................... G06T 5/90
2022/0177005 A1 6/2022 Gottbehüt et al.

FOREIGN PATENT DOCUMENTS

| DE | 102018122725 A1 | 3/2019 |
| DE | 102019002487 A1 | 10/2020 |
| EP | 3282420 A1 | 2/2018 |

OTHER PUBLICATIONS

International Search Report and Written Opinion mailed Nov. 28, 2022 in related/corresponding International Application No. PCT/EP2022/070558.

(Continued)

*Primary Examiner* — Duy M Dang
(74) *Attorney, Agent, or Firm* — PATENT PORTFOLIO BUILDERS PLLC

(57) ABSTRACT

Optical blockage of a vehicle camera is determined using an image of a static scene from an environment of the vehicle is recorded with the camera. Recording conditions existing while the image is being recorded are determined. The recorded image is compared with a reference image, which is retrieved from a vehicle-external server, and is based on recordings that have been recorded by a plurality of vehicles of the same static scene in the same or similar recording conditions. Deviations in image features between the recorded image and the reference image are evaluated as (Continued)

being an indication that the camera is optically blocked if they exceed a pre-determined tolerance.

10 Claims, 1 Drawing Sheet

(58) Field of Classification Search
CPC . G06T 2207/30256; G06T 2207/30261; G06T 2210/21; G06T 7/70; G06T 7/74; G06V 20/56; G06V 20/58; G06V 20/588
See application file for complete search history.

(56) References Cited

OTHER PUBLICATIONS

Office Action created Apr. 21, 2022 in related/corresponding DE Application No. 10 2021 004 414.2.
Raghavan et al.; "Detection of Scene Obstructions and Persistent View Changes in Transportation Camera Systems;" 2012 15th International IEEE Conference on Intelligent Transportation Systems; Sep. 16-19, 2012; Anchorage, AK, USA.

* cited by examiner

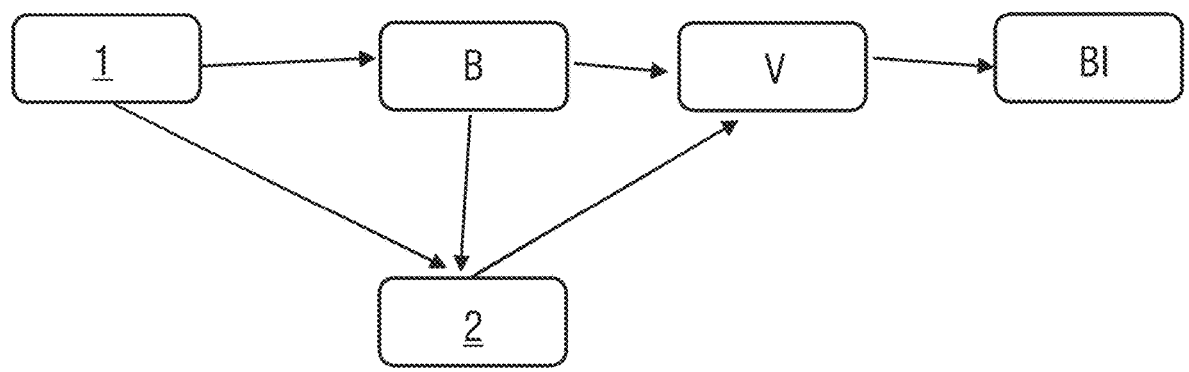

METHOD FOR DETECTING AN OPTICAL BLOCKAGE OF A CAMERA OF A VEHICLE AND METHOD FOR OPERATING A VEHICLE

BACKGROUND AND SUMMARY OF THE INVENTION

Exemplary embodiments of the invention relate to a method for detecting an optical blockage of a camera of a vehicle and to a method for operating a vehicle.

A method for checking an environment recording sensor of a vehicle is known from DE 10 2019 002 487 A1. The location of the vehicle is found in a digital map, and features of stored stationary objects of an environment of the vehicle are identified in the digital map, with it being expected for these features to be recognized by the environment recording sensor. An environment of the vehicle is further recorded with the environment recording sensor, whereby it is deduced that the environment recording sensor is defective if features expected to be recognized are not recognized by the environment recording sensor or if features actually recognized by the environment recording sensor differ significantly from the features expected to be recognized. The digital map having the stored features of the stationary objects is retrieved from a vehicle-external central storage unit for a pre-determined prediction horizon.

Exemplary embodiments of the invention are directed to a new method for detecting an optical blockage of a camera of a vehicle and a new method for operating a vehicle.

According to the invention, in a method for detecting an optical blockage of a camera of a vehicle, an image of a static scene from an environment of the vehicle is recorded with the camera. Static scene means, in particular, that no dynamic objects, and thus in particular no moving objects or objects capable of movement, in particular no other traffic participants, e.g., other vehicles or pedestrians, are present in the scene. In addition, recording conditions that exist while the image is being recorded are determined. The recorded image is compared with a reference image, i.e., with an image that is to be expected when recording the static scene by means of the camera. This reference image is retrieved from a vehicle-external server. It is based on recordings that have been recorded by a plurality of vehicles of the same static scene in the same or similar recording conditions. Similar recording conditions should, in particular, be understood to mean recording conditions that deviate from the recording conditions present while the image is being recorded only within pre-determined limit values. If deviations in image features are determined between the recorded image and the reference image, and if these deviations exceed a pre-determined tolerance, then these deviations are evaluated as being an indication that the camera is optically blocked.

This recognition that the camera is optically blocked, for example due to dirt, is essential for camera-based assistance systems of the vehicle. Image processing algorithms have issues robustly recognizing optical blockages in some environmental conditions, however. This can lead both to a reduced system availability, in particular if an optical blockage is recognized incorrectly, and is not actually present, and to a critical system behavior, for example because other traffic participants are not recognized, in particular in the event that an optical blockage incorrectly fails to be recognized, but is actually present. The method according to the invention solves this problem by making it possible to better and more robustly recognize that the camera is optically blocked.

A location, a time, a lighting situation, weather information, an orientation of the vehicle, and/or a visual range of the camera are, for example, determined as recording conditions. The appropriate reference image can thus be determined with a high degree of certainty.

A brightness, a number of recognized edges, a focus of the recognized edges, a homogeneity, and/or color information are, for example, taken into account as image features. A comparison of the recorded image with the reference image using a plurality of different features is thus enabled, so that the potential optical blockage of the camera can be reliably detected.

The reference image is, in particular, based on averaged image information of the recordings that have been recorded by the plurality of vehicles of the same static scene in the same or similar recording conditions. This is based on the knowledge that an optical blockage of vehicle cameras, for example in the form of dirt, is a phenomenon which occurs only occasionally. If image content, in particular at a pre-determined point of a specific scene, is averaged over several recordings at different occasions, i.e., on different days, but advantageously respectively at the same time of day, with the same recording conditions, then occasionally occurring optical blockage situations are averaged out. A reliable reference image for the comparison with the respective currently recorded image is generated in this manner.

For example, the brightness in the total image and in the total reference image and/or the brightness in individual image regions of the image and of the reference image, and/or the number of recognized edges in the total image and in the total reference image and/or the number of recognized edges in individual image regions of the image and of the reference image, and/or the focus of the recognized edges in the total image and in the total reference image and/or the focus of the recognized edges in individual image regions of the image and of the reference image, and/or the homogeneity in individual image regions of the image and of the reference image, and/or averaged color information about individual image areas of the image and of the reference image are taken into account as image features. The image areas can be the same as or different from the image regions. A reliable comparison of the recorded image with the reference image is thus enabled, so that the potential optical blockage of the camera can be reliably detected.

For example, a lower number of recognized edges in individual image areas of the image that exceed a pre-determined tolerance in comparison with the number of recognized edges in the corresponding image areas of the reference image is evaluated as being an indication that the camera is optically blocked. As an alternative or in addition, a greater homogeneity of the total image that exceeds a pre-determined tolerance in comparison with the homogeneity of the total reference image is evaluated as being an indication that the camera is optically blocked. As an alternative or in addition, this can also be carried out in a corresponding manner with the other features specified above.

In a possible embodiment, the recorded image is transmitted to the vehicle-external server and added to the recordings that have been recorded by the plurality of vehicles of the same static scene in the same or similar recording conditions. The number or recordings on which the reference image is based is thus increased, and the quality and reliability of the reference image are thus in particular improved.

If there is an indication that the camera is optically blocked, it can, for example, be provided that an alternative method for detecting the optical blockage of the camera of the vehicle is then additionally carried out. This alternative method is, in particular, a so-called online blockage recognition. For example, the alternative method is already pre-conditioned with the results determined in the manner described above, in particular in order then to investigate a potential optical blockage in more detail in relevant image areas. A total image thus no longer needs to be examined by this alternative method, and instead only one or more relevant image areas are examined, in which an indication that the camera is currently optically blocked has been determined. This is, in particular, carried out when there is only a pre-determined low deviation in the image features between the recorded image and the reference image, i.e., in particular when this deviation does not exceed pre-determined limit values.

In a method according to the invention for operating the vehicle, which is designed to carry out an automated driving operation, in particular a highly automated or autonomous driving operation, the method described above for detecting an optical blockage of the camera of the vehicle is carried out. If there is an indication that there is an optical blockage, a degree of automation of the driving operation is reduced, or a driving task for controlling the vehicle is transferred to a vehicle driver of the vehicle. This is, in particular, carried out when there is too great a deviation of the image features between the recorded image and the reference image, i.e., in particular when this deviation exceeds pre-determined limit values, in particular in the case of a significant and clear deviation, such that an additional check via an alternative method for detecting the optical blockage of the camera of the vehicle is no longer required, because the actual presence of an optical blockage of the camera can be deduced with certainty or with a high probability from the existing deviation.

A particular performance of the camera for recording the environment of the vehicle, in particular with regard to a visual range, precision and error rate must be ensured for an availability and safety in automated driving, in order to ensure a reliable automated driving operation of the vehicle. A blocked camera, in particular a camera that is blocked too significantly, does not fulfil these performance requirements, however, resulting in a reduced availability of a vehicle function and/or an unsafe system state with a great risk of accident. It is possible to check the camera by means of the method, such that a limited performance of the same is reliably recognized, and the degree of automation of the automated driving operation can be adjusted depending on the performance, or the driving task can be transferred completely to the vehicle driver. A safe driving operation of the vehicle can thus be continuously implemented. This means that potentially dangerous situations, for example no recording or an excessively late recording of dynamic objects and stationary objects in the environment of the vehicle, due to unrecognized drops in the performance of the camera when recording the environment, can be avoided by means of the method. This means that a fault due to the vehicle camera being blocked can be recognized by means of the method, and supporting system reactions can then be introduced, for example from slower driving to an emergency stop.

If the driving task is not taken over by the vehicle driver, for example, it is provided that the vehicle is brought to a standstill within a pre-determined period of time, or is first guided to an edge of the road or to a hard shoulder within a pre-determined period of time, and is then brought to a standstill. This significantly increases the safety of the vehicle, of occupants located within the vehicle, and of other traffic participants. If the vehicle is first guided to the edge of the road or hard shoulder, and only then brought to a standstill, a risk of collision with other traffic participants is in particular further reduced, and safety is thus additionally increased.

Exemplary embodiments of the invention are explained in more detail in the following with reference to a drawing.

BRIEF DESCRIPTION OF THE SOLE DRAWING

Here:
The sole FIGURE schematically shows a sequence of a method for detecting an optical blockage of a camera of a vehicle.

DETAILED DESCRIPTION

The sole FIGURE illustrates a sequence of a possible exemplary embodiment of a method for detecting an optical blockage of a camera of a vehicle 1 is depicted.

In this method, an image B of a static scene from an environment of the vehicle 1 is recorded by the vehicle 1 by means of its camera. Static scene means in this case, in particular, that no dynamic objects are present in the scene.

Recording conditions that exist while the image B is being recorded are additionally determined by the vehicle 1 and are transmitted to a vehicle-external server 2 as a scene description. The image B recorded by means of the camera is advantageously also transmitted to the vehicle-external server 2.

A reference image is retrieved from the vehicle-external sever 2 by the vehicle 1, in particular a reference image corresponding to the scene description, i.e., corresponding to the recording conditions, and is thus transmitted to the vehicle 1. The reference image is based on recordings that have been recorded by a plurality of vehicles of the same static scene in the same or similar recording conditions. The reference image is, in particular, based on averaged recordings of the same scenes, in particular on averaged image information of the recordings that have been recorded by the plurality of vehicles of the same static scene in the same or similar recording conditions.

The connection of the vehicle 1 to the vehicle-external server 2 is, in particular, a radio connection, in particular a mobile connection, for example LTE.

In a comparison step V of the method, the recorded image B is compared with the reference image. The reference image represents the expected image, i.e., an image that is to be expected when recording the static scene by means of the camera.

If deviations in image features are determined between the recorded image B and the reference image, and if these deviations exceed a pre-determined tolerance, then these deviations are evaluated as being an indication that the camera is optically blocked. Corresponding blockage information BI is then generated, which can then be used by the vehicle 1, for example in the method described here or in another method, as is described in the following.

In the following, a possible method sequence is described in detail.

By means of the method, the vehicle 1 tries to recognize at a specific position whether the camera, in particular a camera sensor system for recording the external environment of the vehicle 1, is currently impaired by an optical blockage. The current scene, i.e., the currently present static scene, is, in particular, defined by the recording conditions.

These recording conditions, for example, comprise a current location of the vehicle 1, in particular an exact position of the vehicle 1 determined by means of a global satellite navigation system, a current orientation of the vehicle 1, a current visual range of the camera, a current time, a currently existing lighting situation, for example a status of an external light of the vehicle 1, cloud cover and/or sunlight and/or information from a light sensor of the vehicle 1, current weather information, for example whether rain or snowfall is present or whether it is dry, and of course the information that no dynamic objects, in particular other traffic participants, for example other vehicles or pedestrians, are present in the visual range of the camera, because only then is a static scene present. How current this information is with regard to the recording conditions depends respectively on the point in time of the recording at which the image B is recorded by means of the camera.

The corresponding reference image is retrieved from the vehicle-external server 2, and thus, in particular, from a database located thereon, also described as an online database, for comparison with the image B recorded by the camera. As already specified, the reference image is, in particular, based on averaged image information of the recordings that have been recorded by the plurality of vehicles of the same static scene in the same or similar recording conditions. It is thus based, in particular, on averaged image information from the same or similar, in particular exactly the same scenes as the static scene of the recorded image B. For this purpose, the database on the vehicle-external sever 2 advantageously consists of recordings uploaded, i.e., transmitted to the vehicle-external server 2, by the plurality of vehicles, which recordings are in particular clustered, i.e., are in particular grouped according to different scenes, i.e., according to the different static scenes and their respective recording conditions.

As already specified, the image B currently recorded by the vehicle 1 is advantageously also transmitted to the vehicle-external server 2, and thus added to this database, in order thus to widen the basis for the respective reference image. This is advantageously implemented only after the comparison of the recorded image B with the reference image has been carried out. For example, it can thus be avoided that inappropriate images B are added to the database, in particular images B for which the comparison has yielded an indication that the camera is optically blocked, or at least images B for which the comparison has yielded that there is too large and clear a deviation in the image features between the recorded image B and the reference image, which deviation in particular exceeds pre-determined limit values, such that it can be determined with certainty or with a high probability that the camera is actually optically blocked. A reliability of the reference image can thus be improved.

The comparison of the image B recorded by the camera of the vehicle 1 with the reference image retrieved from the vehicle-external server 2 in the method step V of the method consists, in particular, of evaluating the image features brightness, number of recognized edges, focus of the recognized edges, homogeneity, and/or color information. These image features are also described as image information.

For example, the comparison of the image B recorded by the camera of the vehicle 1 with the reference image retrieved from the vehicle-external server 2 in the comparison step V of the method consists of evaluating the following image features:

the brightness in the total image B and in the total reference image and the brightness in individual image regions of the image B and of the reference image, the number and focus of the recognized edges in the total image B and in the total reference image, and in individual image regions of the image B and of the reference image, the homogeneity of the image B and of the reference image in individual image regions, averaged color information about individual image regions of the image B and of the reference image.

A robust conclusion on whether the image B currently recorded by the camera is impaired by an optical blockage can be made from the comparison described. As described, deviations in image features between the recorded image B and the reference image are evaluated as being an indication that the camera is optically blocked if they exceed a pre-determined tolerance.

If, for example, the number of recognized edges in individual image areas of the image B is significantly lower than the averaged value from the database, i.e., than the number of recognized edges in the individual image areas of the reference image, this indicates an optical blockage in these areas.

If, for example, the homogeneity of the total image B is greater than the averaged value from the database, i.e., than the homogeneity of the total reference image, this indicates an optical blockage.

Thus, for example, a lower number of recognized edges in individual image areas of the image B that exceeds a pre-determined tolerance in comparison with the number of recognized edges in the corresponding image areas of the references image is evaluated as being an indication that the camera is optically blocked, and/or a greater homogeneity of the total image B that exceeds a pre-determined tolerance in comparison with the homogeneity of the total reference image is for example evaluated as being an indication that the camera is optically blocked. As an alternative or in addition, this can also be carried out in a corresponding manner with the other features specified above.

The result of the comparison step V, i.e., the blockage information BI, in particular if the latter contains the indication for the optical blockage of the camera, is then, for example, additionally used to carry out an alternative method for detecting the optical blockage of the camera of the vehicle 1, in particular an online blockage recognition, and in particular to pre-condition the latter in order to examine a potential optical blockage in the relevant image areas more precisely, in particular in the event of lower deviations of the comparison of the image B recorded by the camera with the reference image.

As an alternative, the result of the comparison step V, i.e., the blockage information BI, in particular if the latter contains the indication for the optical blockage of the camera, is, for example, used to directly determine an optical blockage situation, and to switch off corresponding assistance systems of the vehicle 1, in particular in the event of significant, clear deviations of the comparison of the image B recorded by the camera with the reference image. For example, in a method for operating the vehicle 1, which is designed to carry out an automated driving operation, in particular a highly automated or autonomous driving operation, it is provided that the method described above for detecting an optical blockage of the camera of the vehicle 1 is carried out, wherein if there is an indication of an optical blockage, a degree of automation of the driving operation is reduced or a driving task for controlling the vehicle 1 is transferred to a vehicle driver of the vehicle 1. This is, in particular, carried out when too great a deviation of the image features between the recorded image B and the reference image is present, i.e., in particular when this deviation exceeds pre-determined limit values, in particular in the case of a significant and clear deviation, such that an additional check via an alternative method for detecting the optical blockage of the camera of the vehicle 1 is no longer required, because the actual presence of an optical blockage of the camera can be deduced with certainty or with a high probability from the existing deviation.

If the driving task is not taken over by the vehicle driver, for example, it is provided that the vehicle 1 is brought to a standstill within a pre-determined period of time, or is first guided to an edge of the road or to a hard shoulder within a pre-determined period of time, and is then brought to a standstill.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for detecting an optical blockage of a camera of a vehicle, the method comprising:
    recording, by the camera, an image of a static scene from an environment of the vehicle;
    determining recording conditions existing while the image is being recorded;
    comparing the recorded image with a reference image, wherein the reference image is retrieved from a vehicle-external server and is based on recordings that have been recorded by a plurality of vehicles of the static scene in same or similar recording conditions; and
    evaluating deviations in image features between the recorded image and the reference image in order to determine that the camera is optically blocked if the deviations exceed a pre-determined tolerance.

2. The method of claim 1, wherein the recording conditions are a location, a time, a lighting situation, weather information, an orientation of the vehicle, and/or a visual range of the camera.

3. The method of claim 1, wherein the image features are a brightness, a number of recognized edges, a focus of the recognized edges, a homogeneity, and/or color information.

4. The method of claim 3, wherein the following are taken into account as image features:
    the brightness of an entirety of the recorded image and of an entirety of the reference image and/or the brightness in individual image regions of the image and of the reference image,
    the number of recognized edges in the entirety of the image and in the entirety of the total reference image and/or the number of recognized edges in individual image regions of the image and of the reference image,
    the focus of the recognized edges in the entirety of the image and in the entirety of reference image and/or the focus of the recognized edges in individual image regions of the image and of the reference image,
    the homogeneity in individual image regions of the image and of the reference image, and/or
    averaged color information about individual image areas of the image and of the reference image.

5. The method of claim 4, wherein a lower number of recognized edges in individual image areas of the image that exceeds the pre-determined tolerance compared to the number of recognized edges in corresponding image areas of the reference image is evaluated as being an indication that the camera is optically blocked.

6. The method of claim 4, wherein a greater homogeneity of the entirety of image that exceeds a pre-determined tolerance compared to the homogeneity of the entirety of the reference image is evaluated as an indication that the camera is optically blocked.

7. The method of claim 1, wherein the reference image is based on averaged image information of the recordings that have been recorded by the plurality of vehicles of the static scene in the same or similar recording conditions.

8. The method of claim 1, wherein the recorded image is transmitted to the vehicle-external server and added to the recordings that have been recorded by the plurality of vehicles of the static scene in the same or similar recording conditions.

9. The method of claim 1, wherein if there is an indication that the camera is optically blocked, an alternative method for detecting the optical blockage of the camera of the vehicle is then additionally performed.

10. A method for operating a vehicle, which is configured to perform an automated driving operation, wherein a method according to claim 1 is performed, if there is an indication that a camera of the vehicle is optically blocked, a degree of automation of the automated driving operation is reduced or a driving task is transmitted to a vehicle driver of the vehicle.

* * * * *